Patented June 14, 1932

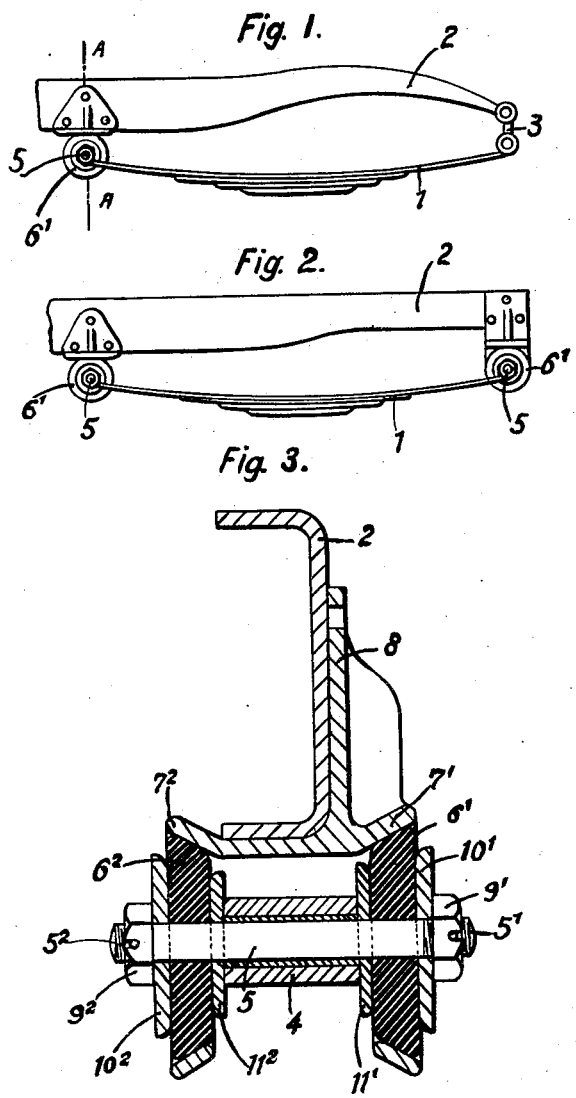

1,862,943

UNITED STATES PATENT OFFICE

LÉON SAIVES, OF BILLANCOURT, FRANCE, ASSIGNOR TO LOUIS RENAULT, OF BILLANCOURT, FRANCE

SUSPENSION SPRING CONNECTION

Application filed September 18, 1930, Serial No. 482,895, and in France October 31, 1929.

The invention relates to the suspension springs of vehicles and more particularly to the connection of the front springs with the underframe through the intermediary of resilient members by which free play of the ends of the springs is rendered possible in all directions, and the reactions due to steering can be suppressed.

According to the invention the front springs, which are of unmodified ordinary type, are attached by their eyes to spindles projecting on both sides of the spring, the projecting parts being supported by the centres of discs of elastic material, the periphery of which is wedged in rings, preferably conical, attached to carrier arms fixed to the underframe.

In the accompanying drawing Fig. 1 shows the front end of an underframe the springs of which comprise the attachment which is the subject of the invention.

Fig. 2 is a modification in which both ends of the spring are provided with the attaching device.

Fig. 3 is a section to a larger scale on the line AA of Fig. 1.

On reference to the drawing it is seen that the front spring 1 is, in the construction illustrated in the drawing by way of example, connected in the ordinary way with the longitudinal bearer 2 at one of its ends by the shackle 3 and at its other end through the intermediary of the device, which is the subject of the invention and which is shown in detail in Fig. 3. The eye 4 of the spring is carried on the spindle 5, and upon the ends of this spindle, which project on both sides of the spring at $5^1$ and $5^2$, discs $6^1$, and $6^2$ of suitable resilient material such as india-rubber are threaded through their centres. These discs are held by their peripheries in collars or rings $7^1$, $7^2$, preferably having an internal conical surface; these collars are attached to a carrier arm 8 fixed to the longitudinal bearer. The fixing of the discs $6^1$, $6^2$, in the collars $7^1$, $7^2$, is done by the clamping of the nuts $9^1$, $9^2$ screwing on to the threaded ends of the spindle 5 and abutting against external metal discs or washers $10^1$, $10^2$ in contact with the discs $6^1$, $6^2$. Internal supporting discs for the rubber discs are also provided at $11^1$, $11^2$. The rubber discs are thus enclosed in seats constituted by the washers $10^1$, $10^2$ and $11^1$, $11^2$ said washers having a slightly curved surface at their periphery on the faces next to the rubber discs so as to allow of a suitable abutment of the discs when deformed.

It is seen in fact that the end of the spring owing to this resilient attachment, can be displaced within small limits in all directions, which allows of improving the steering of the vehicle by suppressing the reactions to steering.

In the construction shown in Fig. 2, both ends of the spring are provided with the attachment in question, which allows of the elimination of the front shackles. This device might also be attached at one of the ends of the front springs and only on one side of the vehicle. This attachment might equally well be applied to all the springs of a vehicle.

I claim:

In a spring assembly for vehicles, a bracket secured to the body of the vehicle and provided with a pair of laterally outwardly diverging flanges, a spindle mounted therein adapted to engage an end of a spring, a resilient washer at each side of the spring surrounding said spindle, the peripheries of said washers being beveled to conform with and engage said bracket flanges, and reinforcing washers mounted on each side of and in contact with said resilient washers, said reinforcing washers having their peripheral edges formed so as to flare away from the sides of said resilient washers, and means for regulating the pressure of the reinforcing washers upon the resilient washers.

In testimony whereof he has signed this specification.

LÉON SAIVES.